Patented Sept. 3, 1940

2,213,745

UNITED STATES PATENT OFFICE 2,213,745

MAKING SILVER-FREE THREE-COLOR PRINTS

Karl Schinzel, Rochester, N. Y., and Ludwig Schinzel, Troppau, Germany, said Karl Schinzel assignor to Eastman Kodak Company, Rochester, N. Y., a corporation of New Jersey No Drawing. Application August 19, 1938, Serial No. 225,836. In Austria September 6, 1937

5 Claims. (Cl. 95—2)

It has been found that special emulsion layers containing a dye are of little advantage in bleaching-out processes, because the mutual effect of the three dyes in a single emulsion layer only aids in better color reproduction, although one should think that each dye alone would make better use of its absorbing power of colored light.

The formation of dyes from leuco bases in Pinachromy has the great advantage of yielding stable three-color photographs. It is surprising that these almost colorless leuco derivatives are sensitive mainly to the complementary light of the dye formed. One must assume then that a small part of the corresponding dye is formed with ultraviolet or blue rays from all three leuco bases, as in photochromies, on the basis of photochloride. This causes a specific sensitization which becomes more pronounced as the dye is formed.

This selective absorption power for colored light which was lacking at the beginning, as well as the unavoidable sensitization not only of the corresponding, but also of the other leuco bases, throws some doubt on the three-color printing process suggested by Kruss and Stenger-Leiber (La Photographie des Couleurs, 1908, 137), where the printing material consists of three different leuco bases (for yellow, blue-red, and blue-green) which are added to the collodion as in the bleaching out process. The saturation of starch granules which has also been suggested, is not much more practical on account of their opacity; in addition to this, the size of the grains makes printing of autochrome pictures almost impossible. Didier (French Patent 524,143) uses three emulsions with leuco bases, sometimes two, one of them containing the leuco bases alone, the other a mixture of leuco base and diazo component which is coupled later.

It has been proved that solvent mixtures as in the bleaching-out process do not guarantee a successful natural color image on account of the reaction between the solvents; the question arose, therefore, as to whether a triple emulsion layer, or a triple grain layer, or a combination of both should be preferred.

The arrangement of three superimposed emulsions is recommended, if all three leuco derivatives are equally sensitive to blue light. The leuco body for the yellow image is added to the upper emulsion; if this is not colored yellow in itself, a yellow salt is used, or a yellow dye is added to this emulsion layer which is later easily washed out or destroyed. Below this emulsion, two other emulsion layers containing the two other leuco derivatives could be arranged; an orange or red filter layer between them is, however, much simpler, a two-grain layer below, which contains the dye formers for the purple and blue-green part images, and above this the homogeneous blue-sensitive emulsion just mentioned with the corresponding generator for the yellow image; between them, perhaps, an easily decolorized yellow filter layer, unless the upper emulsion layer or its dye generator is colored yellow. If the film is exposed through the back, the order of the emulsions must be reversed. The lower emulsion layer may consist of an emulsion of grains containing the corresponding leuco derivative in a solution of the other derivative. In this case, diffusion of the dye generators must be prevented by emulsifying the collodion grains in suitable solutions of cellulose acetate, cellulose ether, polyvinyl alcohol, gelatin, etc., which do not dissolve the particles.

The use of a triple grain layer is possible when only one leuco body is prevailingly blue-sensitive, but the other two either not at all, or only very slightly sensitive; leuco rhodamine 6G, for example, is only very slightly sensitive to orange and the bordering red; to green, however, it is about twenty times more sensitive than to violet. Leuco setocyanine (Schultz, Farbstofftabellen No. 762) is about fifteen times more sensitive to red than to blue, and still more to yellow; leuco flavaniline is almost insensitive to blue.

The two-grain and three-grain layers mentioned must not be thought of as real granular layers, as they are obtained by spraying collodion and gelatin solutions containing dye generators and by re-emulsification of slightly hardened grains in solutions of soft gelatin. We must include also those emulsions which are in a more or less highly dispersed or colloidal state, and are obtained by precipitation of the dye generator with colorless or colored inorganic or organic precipitants in gelatin or collodion solutions, etc., or by formation of the insoluble salts in aqueous solutions and emulsification of the latter after thorough washing in gelatin or collodion solution, depending upon their solubilities. Thorough mixing of these grains or emulsions will guarantee the superimposition of at least two or three different particles; otherwise, the colors cannot be reproduced by subtraction.

In starch grains, etc., the insoluble salts could be formed by double conversion within the grain, glued together after thorough mixing of the three kinds of grains, and then coated on paper. Finely ground cellulose or powdered wool may also be impregnated in three portions with the three insoluble or stably precipitated leuco ester salts, and transparent paper may be produced from this, or emulsion layers with a binding medium of approximately the same refractive index. Cellophane film or paper could also be saturated three times in succession with the corresponding basic dyes. Experiments with leuco bases according to these ideas have been made, and sometimes they yielded satisfactory results when sensitizing dyes were added, as for example, erythrosine, isocyanine, pinacyanol, fulgide, to obtain selective color sensitivity; or leuco setocyanine was precipitated with a green or blue-green dye, and leuco rhodamine with a red acid dye. At that time, the removal of the unused leuco base seemed impossible without also attacking the dye formed, but when the first thioindigo sol was made, its great light sensitivity became apparent, and later experiments were limited to leuco esters of vat dyes in which such difficulties do not arise. It was found that their insoluble salts were sufficiently light-sensitive, when they were finely divided in gelatin with colorless bases or basic dyes. "Solid" solution in collodion, etc., as in the leuco bases, is not necessary. The salt of the dibrominated thioindigo sol with pyronine is mainly sensitive to green; the same is the case with the analogous salt of leuco sulfuric acid ester of hydrocoeruligone. The very stable blue dihydro flavanthrene or its insoluble salt with night-blue or methylene blue also yield a blue-violet leuco sulfuric acid ester which is mainly sensitive to yellow and the adjacent orange. The thioindigo sol golden yellow IGK is intensely yellow, and its insoluble salts with auramine and dicinchonine, quinine, diphenyl guanidine and other high-molecular organic bases are sensitive almost exclusively to blue. Commercial application of these dyes for photographic purposes in color photography was impossible before the war, because at that time no other intensely colored leuco esters were known which were mainly sensitive to complementary colored light, and because they are also unsuited for a printing process using complementary colored negatives for reasons which will be stated later. The production of monochromes is not limited to colored indigo sols or salts, since colorless sols or salts are more sensitive to ultraviolet, sun, and daylight than to blue light, and the color intensity of leuco esters of vat dyes is far from that of genuine dyes, with the exception of the anthraquinone group, especially dyes with heterocyclic rings.

The presence of salts rich in oxygen seems to be of advantage for increasing sensitivity, as for example, chlorate, nitrite, nitrate, perborate, etc., also organic peroxides, or traces of inorganic acids, as for example, perchloric acid. Real oxidizing agents, however, as iron chloride easily produce color fog, less so ferric sulfate, ferric phosphate, ferric citrate, and ferric tartrate, or other weakly oxidizing compounds.

If a photochromy process is based on selective color sensitivity of colorless leuco esters or insoluble salts of colorless leuco esters with dyes, the best reaction is obtained only when the generator of the image dye is colored complementary to the light absorbed in the corresponding emulsion or grain. The salts of colorless leuco esters which are of the complementary color of the acting light, can, therefore, be used only for sensitization. Leuco esters which are already colored in the complementary color and are not much changed in respect to their color, but only in their solubility, may also be used. The following facts must be remembered when they are used in color photography. In natural color pictures a separation image is formed in each emulsion in the approximately complementary color of the acting light. This part image may be produced as a negative or a positive. If the exposed parts are colored, a complementary colored negative appears; if the unexposed parts are colored, a correctly colored positive results.

The latter is obtained also by printing the negative or by reversal and development of the residual silver halide in color, etc.

Different ways are open when silver halide emulsions are used, but in a photochromic printing process the separation images can be formed only by the direct action of the light, a dye being formed in those areas which absorb the incident light. In selective absorption it is assumed that the generator of the final image dye in each separation layer or grain is complementary to the acting light. It seems necessary from previous considerations that the dye formed is approximately of the same color as its generator, if ordinary complementary color negatives are used as originals. A correctly colored positive obtained by reversal is out of the question, because it would produce complementary color prints.

The necessary conditions are fulfilled only when using approximately colorless leuco sulfuric acid esters. The insoluble salts of the leuco ester of a yellow vat dye with auramine or thioflavine T may be chosen for the upper layer, the insoluble salt of a purple vat dye with pyronine, fuschine, or rhodamine for the middle emulsion, and that of a blue-green vat dye with night-blue, methylene blue, or a suitable blue representative of the cyanines, isocyanines, pinacyanols, or of the most recent sensitizers for the lower emulsion layer. Leuco derivatives of these colors may also be used in the form of their insoluble salts with colorless or colored precipitants, as for example, indigosol golden yellow IGK, or its insoluble salt with diphenyl guanidine or auramine, the purple leuco ester of chlorisodibenzanthrone, or its salt with pyronine, rhodamine, etc., the blue-green indigosol green AB or its salt with methylene blue, night-blue, etc. Poorer results would be obtained if yellow leuco derivatives were added to the middle and lower emulsion layers, or a yellow derivative to the middle layer and a red derivative to the lower layer, and selective color sensitivity obtained by precipitation with pyronine or night-blue, etc.

Only red light can penetrate to the lower layer, and, therefore, it is immaterial whether the blue-green leuco ester of its similarly colored salt is sensitive also for yellow in addition to red. On the other hand, the leuco derivative in the middle layer, or its salt must not be sensitive to red, but exclusively to yellow and green. The yellow leuco ester or the salt of a colorless leuco ester with a yellow dye is usually entirely satisfactory for complete absorption of the blue rays in the upper emulsion layer; an easily decolorized filter layer may be arranged between the upper and middle layer, or the upper and lower two-grain layer in double emulsions. The insoluble salts of the residual leuco esters are decomposed after printing by dilute sodium hyroxide, ammonia, or sodium carbonate, and thoroughly washed out. The basic dyes used as precipitants, or similar filter dyes, are washed out with acidified water. The filter dye may also be destroyed by oxidation with substances which do not attack the vat dyes formed.

In the methods of photochromy described insoluble dyes are formed through direct light action. These dyes are complementary to the color of the light absorbed by each individual layer. If intensely colored leuco esters or similar salts are used, the absorption remains unchanged during the exposure. If, however, the colored salts of colorless leuco esters are added, absorption increases at the same rate as leuco esters are converted into dyes. Since the light action progresses from the surface into each emulsion or grain layer, it is not used to its full advantage.

An ideal case would be the use of reduction products which are complementary to the light absorbed, and which are converted into vat dyes of the same color as the light. In this case, the dye formed on the surface allows the rays through which it originated to pass unhindered, and, therefore, also the last trace of the generator below it is reoxidized. If the leuco ester is not sufficiently colored, its salts with dyes of the same color are added.

*o-Nitrobenzaldehyde derivatives* yield indigo dye images through exposure, if the unchanged residue is condensed with acetone or its higher molecular homologues by means of alkalies. o-Nitrophenyl lactic acid methyl ketone is still better suited, although in the reverse sense, because its exposure product turns to indigo even in ammonia gas. Since the residue is washed out with water or bisulfite, it could be used for making sharp photographic tracings. Experiments with selective color sensitivity by coloring the corresponding emulsion or grain layer were not satisfactory. Combination with dyes was more successful, for example, allowing o-nitrobenzaldehydes with hydroxyl or amino groups to react with the chlorides of carboxylic or sulfinic acids of dyes, also of the anthraquinone group, or alkoxylating with halogenated dyes, or preparing their azo dyes, which is, however, sometimes followed by the loss of power to form indigo. The o-nitrosobenzoic acids formed during exposure are removed with sodium carbonate or dilute sodium hydroxide. The anils from o-nitrobenzaldehydes and from dyes with a free amino group could also be used, and the product of exposure left in the image; however, the removal of the residual anil with bisulfite, either direct or after splitting with cold dilute hydrochloric acid is rather complicated.

*Dehydroindigo bisulfite* may be compared to leuco sulfuric acid esters, its yellow halide substitution products being especially light-sensitive. For color photography the corresponding derivatives of the green-blue 4,4'-dichlorindigo and of the purple 6,6'-dihalide derivative or similarly colored substitution products are used. Green or red sensitivity may be obtained, if the latter are precipitated with photosensitizing basic dyes.

*Leuco derivatives of vat dyes.*—In no other dye generator for photographic purposes is the removal of the unused residue so simple as in the salts of leuco sulfuric acid esters, which are usually very soluble in sodium carbonate or alkali; the corresponding vat dyes, however, are usually not soluble. Also the esters, with alkyl sulfuric acids, phosphoric acid, phosphorous acid, alkyl phosphoric acids, chlorformic acid ester, malonic acid, sulfoacetic acid, sulfobenzoic acid, and analogous acid esters of leuco dyes are light-sensitive, and their residue is soluble in sodium hydroxide or sodium carbonate solution.

Some ester acids are tenaciously held by gelatin, but they must be completely washed out from the covered areas of the three-color image, because they are light-sensitive. It is, therefore, better in these cases to use agar, starch glue, acyl and ether celluloses, also water-soluble compounds, polyvinyl alcohol or polyacrylic acids or their esters, also mixed polymers with other unsaturated compounds, especially also divinyl benzol, perhaps with addition of some gelatin for the emulsification of their insoluble salts with colorless precipitants or basic dyes.

Thioindigo sols and selenoindigo sols with several bromine or iodine atoms are especially light-sensitive, also the mixed sols with only one ring containing sulfur or selenium. They are not only red to purple hues, but the naphthalene thioindigo are also blue to blue-green, similarly constructed vat dyes are yellow-orange to lemon-yellow. This strong sensitivity to light is also peculiar to those colored leuco esters which are obtained from their amino derivatives by diazotization and coupling with the different components, or by combination with other chromophore systems and dyes.

With few exceptions, the vats and leuco sulfuric acid esters of the indigo and thioindigo group, of the semi-indigoid and lignoid dyes, are colorless or weakly yellow colored; only the condensation products of indoxyl, thioindoxyl, selenoindoxyl, etc., with acenaphthene quinone are colored intensely violet, those with dialdehydes orange-yellow. On the other hand, the vat dyes of the anthraquinone group and their derivatives with heterocyclic rings yield intensely colored leuco sulfuric acid esters which are often of a complementary color to the dye, and in other cases resemble it. The color of the leuco ester of the yellow phthaloylfluoranthrene is more intense than that of the latter. The colors of the salts may also differ from that of the free ester acid; it is, however, only in rare cases very striking. The leuco ester of anthraquinone-2,3-thioxanthone is greenish-yellow, but the salts are red. Flavanthrene and phenanthridine yellow yield two series of leuco sulfuric acid esters, blue-violet and red, corresponding to the dihydro and tetrahydro form, while only a red-violet ester is known of indanthrene, although the latter is able to pass through several hydration forms. The green di-β-chlor-anilidobenzoquinone and the dimethyl-dibenzanthrone and dimethoxybenzanthrone of the same color yield red leuco sulfuric acid esters, the purple chlor-isodibenzanthrone, however, a red-violet, the red anthraquinone-1,2-naphthacridone a yellow. The very recently synthesized azo indigo sols which are usually in no relation to the colors of the corresponding vat dyes, and may be the same or complementary to them, show a surprising variety of colors.

While diazotization of the amino group of vat dyes sometimes is difficult, as it is in the case of those of the thioindigo group, it is usually easy with the corresponding leuco sulfuric acid esters. It is surprising that the acidified nitrite does not cause immediate reoxidation to the vat dye, and with an excess only, when the amount necessary for diazotization is used. The tendency of the amino group to change to the diazonium compound is much stronger than that of the leuco sulfuric acid ester to reformation of the vat dye. It is, therefore, best to let any aminobenzoyl chloride or amino benzol sulfonic chloride or 1-diazo-β-naphthol-4-sulfochloride, or directly the corresponding amino derivatives, also anthranil acid chloride or isotoic acid anhydride react with vat dyes which cannot be diazotated, and follow with reduction, or perhaps repeat this process, then diazotate the external amino group and couple with any component. One may also let salicylic chloride react with the amin or hydroxy indigo, couple the products obtained with diazo compounds, and prepare the leuco ester from this. Direct coupling of vat dyes from hydroxyl or amino groups or their leuco esters is sometimes successful.

One may go one step further and condense the vat dyes containing one amino-hydroxyl or mercapto group with the chlorides of carboxylic acids or sulfonic acids of finished dyes. The azo dyes concerned here are the azo aceto-acetic acid combinations, the azo dyes from sulfanilic acid and naphthionic acid, however, are difficult to convert into their chlorides. On the other hand, the urea chlorides or isocyanates of certain azo dyes may also be used for this purpose. The chlorides of the carboxylic acids of thioindoxyl or of thioindigo can also be made to react with other dyes, even vat dyes.

The diazo and diazohydroxylamino derivatives of anthraquinone which are also light-sensitive and can be used for coupling with components, are worth mentioning. Diazo anthraquinone yields very stable diazonium compounds with aromatic amines which are not even split by alkaline hydrosulfite.

The splitting of the azo bond in the production of leuco sulfuric acid esters must be counteracted by weaker reducing agents.

The light sensitivity is not limited to the leuco sulfuric acid esters and other acid or neutral esters of vat dyes; more or less light-sensitive are also the insoluble or rather difficultly split or oxidized esters of leuco vat dyes with arylsulfochloride, benzoyl chloride, and also the insoluble esters with benzyl chloride or leucotrope "O", with phenols or naphthols, with alcohols, also the corresponding soluble ethers with leucotrope "W", monochloracetic acid, etc. The removal of the unused residue is somewhat difficult with insoluble ethers and esters, if the aryl residue is not substituted by hydroxyl and thereby becomes soluble in alkali. One must, therefore, use salicylic acid chloride or the chloride of a dihydroxy or trihydroxybenzol carboxylic acid instead of benzoyl chloride for esterification. These substituted acid chlorides react not only directly with the leuco forms of the vat dyes, but also with the intermediate products, carbamide acid or allophanic acid esters of the latter and similar derivatives described in the patent application S. N. 177,738, filed December 2, 1937.

In the methods of coupling and uncoupling of vat dyes mentioned in the patent description the residue of the generator can usually be regenerated also by exposure instead of by oxidation, perhaps in the presence of mild oxidizing agents, as for example, nitrite, nitrate, chlorate, bichromate, chromate, ferric citrate, etc., which alone do not oxidize the leuco derivative to the dye, or only after a very long time.

1-diazo-β-naphthol-4-sulfochloride, carboxylic acid chloride and similar compounds may be made to react with thioindigo white and other leuco vat dyes in order to obtain light-sensitive esters from which the vat dye is produced either directly, or the dihydroxy naphthalene sulfonic acid derivative which is soluble in dilute sodium hydroxide, depending upon the length of the exposure. If the exposure has been so long that the indigo dye has formed, the residue may be converted by a shorter exposure into the dihydroxy naphthalene sulfonic acid ester which is washed out with sodium hydroxide. The residual diazo anhydride sulfonic acid ester could also be coupled with phenol sulfonic acid, resorcin, phloroglucine, or their sulfonic or carboxylic acids to the azo dyes which are soluble in sodium carbonate or sodium hydroxide.

When leuco sulfuric acid esters or their insoluble salts are present, the vat dye formed previously by the light could be reduced with hydrosulfite and dilute sodium hydroxide, if moderate warming, according to the nature of the emulsion or grains, is permissible, also with leucotrope "W", followed by washing out with sodium carbonate. The removal with sodium hydroxide is possible only if strongly basic quaternary organic compounds or dyes have been used as precipitants whose salts are sufficiently stable to very dilute sodium hydroxide. The vat dye is then regenerated by exposure or oxidation from the residual insoluble salt.

Instead of adding mild oxidizing agents to the emulsions or grains, one may also use as precipitants high-molecular basic compounds which contain an oxidizing group in the molecule. An iodoso, nitroso, peroxide or peracid group, a dichlorylsulfamide or dibromylsulfamide, or better, a chloryl or bromylsulfamide group or their alkali salts are easily obtained from the aminobenzolsulfamido by combination with high polymers or addition of high-molecular precipitants, according to the patent application S. N. 151,811, filed July 3, 1937. One must, of course, see that these high-molecular precipitants have a sufficiently basic character by introducing an end member of strongly basic character into a terminal hydroxyl or amino group or such a group in an aromatic nucleus, perhaps the m-aminophenyltrimethyl ammonium chloride group or a safranine group. This may be accomplished by diazotation and coupling, or by making these groups react first with chloracetyl chloride, and the m-chlorine atom with the high-molecular substances mentioned. The urea chloride may also be formed with phosgene, the procedure being the same as before. Two molecules containing oxidizing groups can first be chained with cyanide chloride, and the third chlorine atom substituted by safranine or another strongly basic group, as mentioned above; of course, also vice versa, two molecules of safranine are chained, etc.

Compounds of silver chloride, silver bromide, and perhaps also silver iodide with thiourea, the former in the proportion of 1:2, the latter 1:1, are also suitable as precipitants of thioindigo sols and other leuco sulfuric acid esters. Apparently, the halide atom is replaced by the indigo sol residue with the formation of sodium halide. Short action of a solution of table salt may reform some silver chloride in these compounds which is light-sensitive and acts as an oxidizer on the leuco ester salt closely combined with it.

Voluminous precipitations of oxidizing agents could be used with these thiourea complex salts of the silver halide or, with high-molecular organic bases, alkaloids, dyes, etc., also with diphenylguanidine and triphenylguanidine, to adsorb the indigo precipitation, so that the leuco ester comes in very close contact with the oxidizing agent. The insoluble salts of oxygen acids are mainly considered for this purpose, for example, chromates, bichromates, chlorates, or perchlorates, and nitrates. Of course, such a simple adsorption combination has not the same effect as the introduction of an oxidizing group into the molecule of the precipitant itself. Its application is justified with a mixture of grains to prevent oxidation of the wrong grains in the light by oxidizing agents between the grains, as in impregnation of the light-sensitive emulsion with liquid oxidizers; a cooperation of weak oxidizers is desirable only in those areas where colored light was absorbed. One could also use the insoluble salts of luteocobaltic chloride ammonium, or the thallocobalt nitrite as condensation nucleus, on which they are precipitated as insoluble salts after impregnation with thioindigo sols.

High molecular indigo sols may also yield insoluble salts with light-sensitive substances, as for example, mercury or silver salts, luteocobaltic chloride, etc.

Some dyes yield precipitates of relatively low light-sensitivity with leuco sulfuric acid esters in pure aqueous solutions, so, for example, methylene blue or rhoduline violet with thioindigo sol "R", although rhoduline violet with thioindigo sol "O" is very good as a sensitizer. It is doubtful whether this is to be ascribed to the large grain size of the precipitate, or whether some dyes have some kind of desensitizing effect on certain thioindigo sols and reduce their sensitivity. This appearance seems to be very specific. Indigo sol CG yields a precipitate with methylene blue which quickly turns green in the light; in the presence of traces of acid, a sign that the yellow indigo has again formed, most intensely under the blue filter. This precipitate becomes black with rhodamine solution, rhodamine "B" is, therefore, probably adsorbed. With further exposure, it becomes yellow-green again, the rhodamine "B" has apparently been destroyed and has contributed to the reoxidation of the indigo sol. If indigo yellow "CG" is precipitated with rhodamine alone, the colloidal precipitate which is at first bluish, is deposited as a red precipitate in the presence of traces of acid. Coated on paper, rhodamine becomes colorless after a certain time and a pure yellow indigo image appears. Indigo sol "O" is precipitated by rhodamine "B2" in the presence of very little acid and is very strongly catalyzed, yielding a blue color much quicker than without addition of rhodamine "S", evidently sensitizes much stronger, yielding a precipitate with the coloreless indigo sol "O" and becoming at once blue; it is, therefore, of very high light sensitivity. Also rhoduline violet sensitized indigo sol very strongly. Flavaniline, however, is hardly active with indigo sol, but yields a precipitate with thioindigo sol "B", which not only in the neutral or weakly acid state, but even in weakly alkaline, changes quickly into the red thioindigo dye in the light. Also, safranine seems to sensitize indigo sol, tetraethyl safranine, very strongly. Flavinduline and thiosinamine, however, are almost without effect. Rhodamine "B" was weakly acidified for control and exposed for twenty-four hours without showing any changes. When indigo sol "O" or "O48" was added, a blue precipitate quickly formed. Rhodamine "B" and "S" work best in the presence of some chlorate and acid. Nitrite, when neutral, quickly yields an intensely red solution, with indigo sol alone in the light, and indigo is precipitated from the solution on acidification, even with 1% acetic acid; this corresponds, perhaps, to dehydroindigo. One may see from these examples that an acceleration of the photochemical processes is very likely possible with certain dyes, and further experiments must determine the best of them.

The action of photo-sensitizers in photochromy is identical with that of optical sensitizers with silver halide; just as these are rather quickly adsorbed to silver chloride and silver bromide precipitated in water, so also the insoluble salt from indigo sol or thioindigo sol "R" suspended in water can completely decolorize a red solution of rhodamine "B" because it is entirely adsorbed and blue forms quickly in the presence of traces of acid through generation of indigo and destruction of rhodamine "B". Rhoduline violet also acts very vigorously here. The weakly acidified insoluble salt from indigo sol and thioflavine T becomes green in the light, and blue much more quickly after adsorption of rhodamine "B". On the other hand, the salt is much less sensitized with quinine.

The precipitating bases could first be adsorbed in a finely ground state to silica gel, or indigo sols and fluorescent dyes in the same way to powdered alumina gel, etc.

The extraordinarily high adsorption power of the colorless precipitates of indigo sols with diphenylguanidine and certain dyes suggests that some kind of filter action is obtained, for example, by producing a superficial precipitate of night blue or methylene blue on the yellow salt of indigo sol "O" and thioflavine "T", so that really only the blue rays act. This superficial shell could be made more waterproof by precipitation of night blue or methylene blue on the yellow salt of indigo sol "O" and thioflavine "T", so that really only the blue rays act. This superficial shell could be made more waterproof by precipitation with phosphotungstates of higher organic sulfonic acids. When leuco sulfuric acid esters from greenish indigos are used for the lower separation image and complementary color negatives are used for printing, precipitation is done with malachite green and other green basic dyes, and rhodamine "6G" or "B" is adsorbed to obtain a red filter effect.

This superficial hull of a color filter is, of course, better obtained with real grains obtained by pulverizing a collodion solution containing a salt of an indigo which is soluble in ether-alcohol but not in water. Also here the adsorbed basic dye is made insoluble by treatment with phosphotungstate, etc., or the precipitant of the gelatin solution is added to emulsify the grains, so that each grain appears to be superficially surrounded by a hull of the insoluble filter dye salt.

In the preparation of prints from triple-layer, three-grain layer, or double layer material described before, it is, of course, well to eliminate all ultraviolet and violet rays from the printing light, or to use synthetic light with three narrow regions corresponding to the primary colors. The use of color filters is often advisable, and with their aid one may better adapt the action of the individual exposures by colored light to the requirements of the printing material. Of course, one may also use three black or colored single separation negatives or positives of the commonly used or the new type. One may also combine with a silver image to obtain the black parts of the image in perfect natural colors.

*Three-color prints by repeated impregnation with leuco derivatives.*—The high light-sensitivity of leuco sulfuric acid esters and similar leuco derivatives of vat dyes makes them particularly suitable for natural color motion pictures, lantern slides, and paper images from complementary color negatives or positives, if the sensitizers mentioned above and oxidizing additions are used. Since the light of the mercury quartz lamp has been concentrated ten to twenty times, and still higher concentrated light is available in the high-pressure quartz tube mercury light, the printing time of the separation image can be kept down to a surprisingly low value. It has been suggested in U. S. Patent 1,918,623, July 18, 1933 that an emulsion be impregnated three times in succession with the light-sensitive substance, and each time exposed and the unused indigo sol removed. It is, however, almost impossible to obtain a pure black, because the gelatin layer is tanned in the areas which have been acted upon by light, and thin collodion, Cellon, or Cellophane layers become almost impenetrable through the dye formation, so that a solution of the leuco sulfuric acid ester which is needed later cannot penetrate into these areas. All three dyes must be superimposed in sufficient density to obtain black. This may be corrected by the addition of a black image obtained in some other way either by colored development, or by exposure after impregnation with an indigo sol yielding a black dye, or by a silver image which has received a short but intense development, or still better, was printed in all three cases from a correct black negative. This negative is obtained either by a fourth exposure, or by a differential process from the three separation negatives, by printing transparencies of the latter in one single emulsion (U. S. Patent 1,978,979, October 30, 1934).

If the two superimposed emulsions are printed from both sides, according to DRP 614,322, June 6, 1935, it is almost impossible to obtain the correct separation images, because diffusion of the leuco esters is unavoidable in coating. This source of error may be eliminated, if the insoluble salts of the indigo sols with diphenylguanidine, cinchonine, quinine, aristochin, and other higher-molecular organic bases are added to the emulsions, perhaps also those with yellow or red dyes which may serve also as light filters to prevent printing through without coloring the emulsion carrier. The insoluble salts are decomposed after exposure with sodium hydroxide or sodium carbonate and washed out, the basic salts perhaps with acidified water. The emulsion layer used consists not only of gelatin but also of collodion or cellulose acetate, etc., with a coating of dextrin, sugar or gum arabic to keep the pores open, and also of viscose film. Until now it was not known whether insoluble leuco esters are sufficiently light-sensitive; this is now known to be the case. The salts of indigo sols with organic bases which are soluble in alcohol-ether or acetone, but almost completely insoluble in water, are used for collodion emulsions, or a collodion or celluloid layer is combined with such an acetyl or ether cellulose to prevent solution or swelling of the lower layer during coating of the other layers. Mild oxidizing agents, soluble in organic solvents, as for example, nitromannite, benzoylperoxide, etc., and salts insoluble in water with basic dyes or those of colored leuco esters may also be added to the emulsion.

In the successive impregnations with the three indigo sol solutions after the first exposure, the residues of the leuco esters can be completely removed only by washing longer, especially in gelatin layers. This greatly prolongs the preparation time of the image. A brief wash is, therefore, recommended and colored indigo sols or their colored salts with dyes dissolved in alcohol used for the second and third impregnation, so that the ultra-violet, white, or better, complementary colored printing light is at least partially absorbed by this new impregnation, or only inactinic light acts on the residue of the previous indigo sol.

0.1-4% HCl, $HNO_3$, trichloracetic acid, etc., are added to the 1-3% impregnation solutions in order to obtain quicker dye formation. It has been found that only certain indigo sols coated in neutral or weakly alkaline solution, are rapidly reoxidized by light. If the addition of acid shall be eliminated, the introduction of small amounts of oxidizing agents to the impregnation solution, as for example, nitrite, nitrate, chlorate, potassium ferricyanide, bichromate, the sulfonic or carboxylic acids of organic peroxides, nitrosulfacids, etc., appears advisable. Sensitizers, for example, rhodamine "B", etc., are added.

The use of insoluble salts of the indigo sols is of advantage not only with several emulsion or grain layers, but also in making monochromes, because this always prevents partial diffusion of the water-soluble indigo sol into the carrier, for example, paper, or partial unremovable attachment to the support. The latter would lead to a general color fog during the subsequent light action.

The faulty reproduction of black in the triple impregnation by tanning of gelatin and other colloids may be reduced by exposing through the back, because, just as in the pigment process, the light action progresses from the bottom to the top. This procedure should be applied especially when making prints from three-color images, where colored indigo sols or their alcohol-soluble salts are, of course, preferred for impregnation, perhaps with addition of sensitizers which are sensitive under their corresponding filters.

*Making the correctly colored negative for printing.*—The double emulsions mentioned on page 1 have been proposed for color development already in the patent application S. N. 139,758, filed April 29, 1937, on the basis of silver halide, and, of course, may also be mixed with the corresponding components to produce the correctly colored negatives required on page 2 of this description by colored development coupling. Of course, such silver halide double emulsion layers (two-grain layers) may be used also in other processes of color photography. Generally, a blue-sensitive homogeneous emulsion is combined with a heterogeneous emulsion containing the particles sensitized for green-yellow filter, unless the upper emulsion is colored yellow, either with a specially easily washed out or destroyed yellow filter dye, or with a yellow color which is inherent to the image dyes or their leuco forms or generators. The corresponding coupling components or other dye formers or (leuco) dyes may be added directly to the homogeneous layer or emulsion grains, and may be changed in the image either by one of the methods of color photography, or the entire layer of grains is first very generally and uniformly regenerated and followed by the process which forms the real image. In the destruction processes this may be accomplished also by destroying first the image or changing the solubility, and then only regenerating to the final image dye.

Just as in the preparation of a complementary color negative by exposure in the camera, dye is generated or remains unchanged in the correct color negative in the areas of the action of the colored light which is absorbed in each emulsion. In destruction processes it is, therefore, necessary to destroy the leuco derivative or the dye diffusely formed from it, in the unexposed areas of each emulsion, or to change its solubility so that it may be easily washed out.

As explained in the patent application Serial No. 214,578 of June 18, 1938, page 10, the silver halide of a triple emulsion consisting of a highly sensitive silver chloride, may be easily substituted after first development by oxidizing compounds through ferricyanide. If the silver bromide emulsions are to be used for the exposure, the residual silver bromide of the unexposed areas may be substituted by ferricyanide or directly by silver chromate, bi-chromate, vanadate, etc., only if the conversion takes place in the presence of about ½–1% solution, according to the U. S. A. Patent 2,013,159, September 3, 1935. The residual very high-polymer silver bromide may also be converted into the thiourea silver complex with phosphotungstate, from which silver ferrocyanide forms through potassium ferrocyanide, which in turn may be converted into oxidizing, catalyzing, or reducing compounds. This complex behaves like a high-molecular base, and, therefore, may also serve for the formation of organic peroxides in the form of their carboxylic acids or sulfonic acids in the image, according to the U. S. A. patent named, for example, by adding the sulfoperoxides, which are easily obtained from m-benzolsulfochloride or stearoyl sulfochloride, as sodium salts to the conversion solution. It is best to deposit the catalyzing vanadinic acid complex salt in this manner in the image, to convert it perhaps into vanadyl ferrocyanide, and to destroy the (leuco) dye with acidified chlorate or bromate solution. Substituted oxidizing agents or catalysts may, of course, also be used for the formation of dyes in place of the residual silver bromide, according to the application Serial No. 214,578 of June 18, 1938.

Even though it may be possible to regenerate the dye from the added leuco compound only after destruction of the image, this should usually be done first, because in this case this operation may be combined with the removal of the primarily reduced silver. The leuco sulfuric acid esters added as insoluble or non-diffusing salts and other leuco derivatives of the vat dyes are reoxidized simultaneously with the metallic silver by acidified bichromate, persulfate, hydrogen peroxide solution, etc., and the silver sulfate formed is thoroughly washed out. In addition to many indigoid and semi-indigoid dyes with only one indole nucleus, most lignone dyes are suitable for the destruction by oxidation of catalysts, but hardly the thioindigo dyes which are very stable to oxidizing agents.

The triple emulsion for the correctly colored negative could, of course, also serve for the sound track and perhaps a guide line, preferably in reversed order of the emulsions, so that the blue-sensitive, very fine-grain or grainless, perhaps highly sensitized AgCl or AgBr emulsion is at the bottom; printing is done through the back to protect the sound track from damage. The sound track is best recorded in push-pull or by the modern high-fidelity processes in variable width recording. The sound track and guide line are, of course, separated 10–30 cm. in the positive for simultaneous control of the sound volume required at the moment and detection of the sound record by one of the photoelectric cells. The photoelectric cells are correspondingly sensitive. In a double emulsion the sound track is, of course, placed in the homogeneous blue-sensitive emulsion, and the heterogeneous layer may be used for the guide line, because the ground noise caused by the grains has no effect, when the guide line is controlled over a large space ½–1 cm.; this is permissible, because the sound volume usually remains constant during such a short time. For this reason, the guide line may, in this case and in general, be produced outside the perforations by photography or mechanical impression, preferably on the left and right border, so that both are controlled at the same time.

It is to be understood that numerous modifications may be made in our methods of treating photographic layers, and that our invention is to be taken as limited only by the scope of the appended claims.

What we claim is:

1. The method of forming a colored photographic image in a sensitive layer containing leuco vat dyes, which comprises sensitizing the leuco vat dye to light of the color which it is to record, by combining it with an organic dye.

2. A light-sensitive photographic material for forming multi-color images which comprises a support having coated thereon a sensitive layer containing a colorless insoluble salt of a blue-green vat dye combined with an optical sensitizing dye, a layer containing a colorless leuco salt of a magenta vat dye combined with a phenyl methane dye derivative, and a layer containing a colorless leuco salt of a yellow vat dye combined with a primuline dye.

3. A light-sensitive photographic material for forming multi-color images which comprises a gelatine layer coated on said support containing a colorless leuco salt of a blue-green vat dye combined with a dye selected from the group consisting of cyanines, isocyanines and pinacyanols, coated on said gelatin a second gelatine layer containing a colorless leuco salt of a magenta vat dye combined with a dye selected from the group consisting of pyronine, fuschine and rhodamine and coated on said second gelatine layer a third gelatine layer containing a colorless leuco salt of a yellow vat dye combined with a dye selected from the group consisting of auramine or thioflavine T.

4. The method of forming a natural color photographic image in three superposed sensitive layers which comprises sensitizing the red sensitive layer with a colorless insoluble leuco salt of a blue-green vat dye combined with an optical sensitizing dye, sensitizing the green sensitive layer with a colorless leuco salt of a magenta vat dye combined with a phenyl methane derivative, and sensitizing the blue-sensitive layer with a colorless leuco salt of a yellow vat dye combined with a primuline dye, and exposing and developing the multi-layer coating and removing the residual leuco salts in a dilute alkaline solution.

5. The method of forming a colored photographic image in a gelatin layer sensitized with an insoluble colorless leuco salt of a vat dye combined with an organic dye which comprises forming an image in the layer by exposure and development and removing the residual leuco ester by washing the layer in a dilute alkaline solution.

KARL SCHINZEL.
LUDWIG SCHINZEL.

CERTIFICATE OF CORRECTION.

Patent No. 2,213,745.    September 3, 1940.

KARL SCHINZEL, ET AL.

It is hereby certified that error appears in the printed specification of the above numbered patent requiring correction as follows: Page 3, second column, line 71, strike out the words and comma "chloride react with the amino or hydroxy indigo," and insert instead --acid chloride or any naphthol carboxylic acid--; line 72, for "amin" read --amino--; page 7, second column, line 43, claim 3, for "fuschine" read --fuchsine--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.